(12) United States Patent  
Fullerton et al.

(10) Patent No.: US 8,812,889 B2  
(45) Date of Patent: Aug. 19, 2014

(54) MEMORY POWER MANAGER

(75) Inventors: Mark N. Fullerton, Austin, TX (US); Sathish Kumar Radhakrishnan, Irvine, CA (US); Brent Mulholland, Boulder, CO (US); Ravi S. Setty, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 564 days.

(21) Appl. No.: 12/774,479

(22) Filed: May 5, 2010

(65) Prior Publication Data

US 2011/0276817 A1 Nov. 10, 2011

(51) Int. Cl.
- *G06F 1/26* (2006.01)
- *G06F 1/32* (2006.01)
- *G06F 13/16* (2006.01)

(52) U.S. Cl.
CPC .......... *G06F 13/1668* (2013.01); *G06F 1/3203* (2013.01); *G06F 1/3275* (2013.01); *Y02B 60/1225* (2013.01)
USPC ........... 713/324; 713/300; 713/320; 711/100; 711/150; 711/151

(58) Field of Classification Search
USPC .......... 713/400, 401, 300, 320, 324; 711/100, 711/150, 151
See application file for complete search history.

(56) References Cited

U.S. PATENT DOCUMENTS

| | | | |
|---|---|---|---|
| 6,182,196 B1 * | 1/2001 | DeRoo | 711/144 |
| 6,618,791 B1 * | 9/2003 | Dodd et al. | 711/105 |
| 7,702,846 B2 * | 4/2010 | Nakanishi et al. | 711/103 |
| 2001/0011356 A1 | 8/2001 | Lee | |
| 2003/0167385 A1 * | 9/2003 | Lai et al. | 711/167 |
| 2005/0122819 A1 | 6/2005 | Park | |
| 2008/0219083 A1 | 9/2008 | Chang | |
| 2008/0276108 A1 * | 11/2008 | Surgutchik et al. | 713/323 |

OTHER PUBLICATIONS

Delaluz V et al.: "DRAM Energy Management Using Software and Hardware Directed Power Mode Control," High Performance Computer Architecture, 2001. HPCA. The Seventh Intern National Symposium on Monterrey, Mexico Jan. 19-24, 2001, pp. 159-169, XP010531683, 11 pages.

European Search Report for EP11003490.7 dated Sep. 23, 2011, 3 pages.

* cited by examiner

*Primary Examiner* — Michael J Brown

(74) *Attorney, Agent, or Firm* — Garlick & Markison; Holly L. Rudnick

(57) ABSTRACT

Controlling access to memory includes receiving a plurality of memory access requests and assigning corresponding time values to each. The assigned time values are adjusted based upon a clock pulse and a priority access list is generated. Factors consider include missed access deadlines, closeness to missing access deadlines, and whether a page is open. The highest ranked client is then passed to a sequencer to allow the requested access. Time values may be assigned and adjusted according to client ID or client type (latency or bandwidth). A plurality of power modes of operation are defined wherein operation in a selected power mode of operation is based at least in part on the assigned or adjusted time values. The processing is performed in hardware in parallel (at the same time) by associated logic circuits.

24 Claims, 11 Drawing Sheets

MIMO transceiver memory access system memory controller system memory controller system memory controller system

MEMORY POWER MANAGER

BACKGROUND

1. Technical Field

The present invention relates to memory access control and, more particularly, to circuitry for determining memory client priority access to memory.

2. Related Art

With increase density, today's electronic circuits are becoming increasingly complex supporting development of entire systems on a single chip or at least in a small package. Moreover, such advances allow devices to be developed for sale at a low cost that include increasingly greater functionality. As such, many protocol systems and devices may be collocated wherein such devices share some hardware such as memory. In today's environment, however, where many different systems may seek access in real time to a common resource such as memory, memory control becomes an increasingly important part of creating a device or system that has substantial functionality. Because much of this functionality has real time memory access requirements that cause the functionality to fail or degrade if memory latency is too high (for example if required access times are exceeded), a memory control system that can service the memory access requests from the various functional modules.

Mobile devices, with such substantial functionality, now allow users to effectively have powerful computing devices that support a vast array of popular functionality for data delivery, communication services of many types, etc. One aspect of such mobile devices, however, is that power savings modes are required to extend battery life to enable the user to go longer periods without having to recharge or replace batteries. Thus, power modes of operation are often designed into systems to reduce power consumption by the various modules within a device according to operational modes and operational requirements. In many cases, a circuit may be powered down to either an off state or a reduced power state for a fraction of a second. Cumulatively, such power cycles serve to reduce power consumption and to increase battery life.

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Typically, the data modulation stage is implemented on a baseband processor chip, while the intermediate frequency (IF) stages and power amplifier stage are implemented on a separate radio processor chip. Historically, radio integrated circuits have been designed using bi-polar circuitry, allowing for large signal swings and linear transmitter component behavior. Therefore, many legacy baseband processors employ analog interfaces that communicate analog signals to and from the radio processor.

In a mobile wireless device, therefore, many such communication systems may be included in addition to systems or modules that perform other functionality. Many such modules have frequent necessity to access memory to retrieve data, to store data, or to refresh or update a user interface device such as a display or a speaker. Accordingly, power savings modes of operation may depend not only upon whether a device or module is currently being used and is in an operational mode, but also upon known timing characteristics of a particular operation of the module or system. For example, according to an associated communication protocol supported by a particular module, a power saving mode of operation may be able to determine that a circuit may be powered down and powered back up within a period before the module is required to operate.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
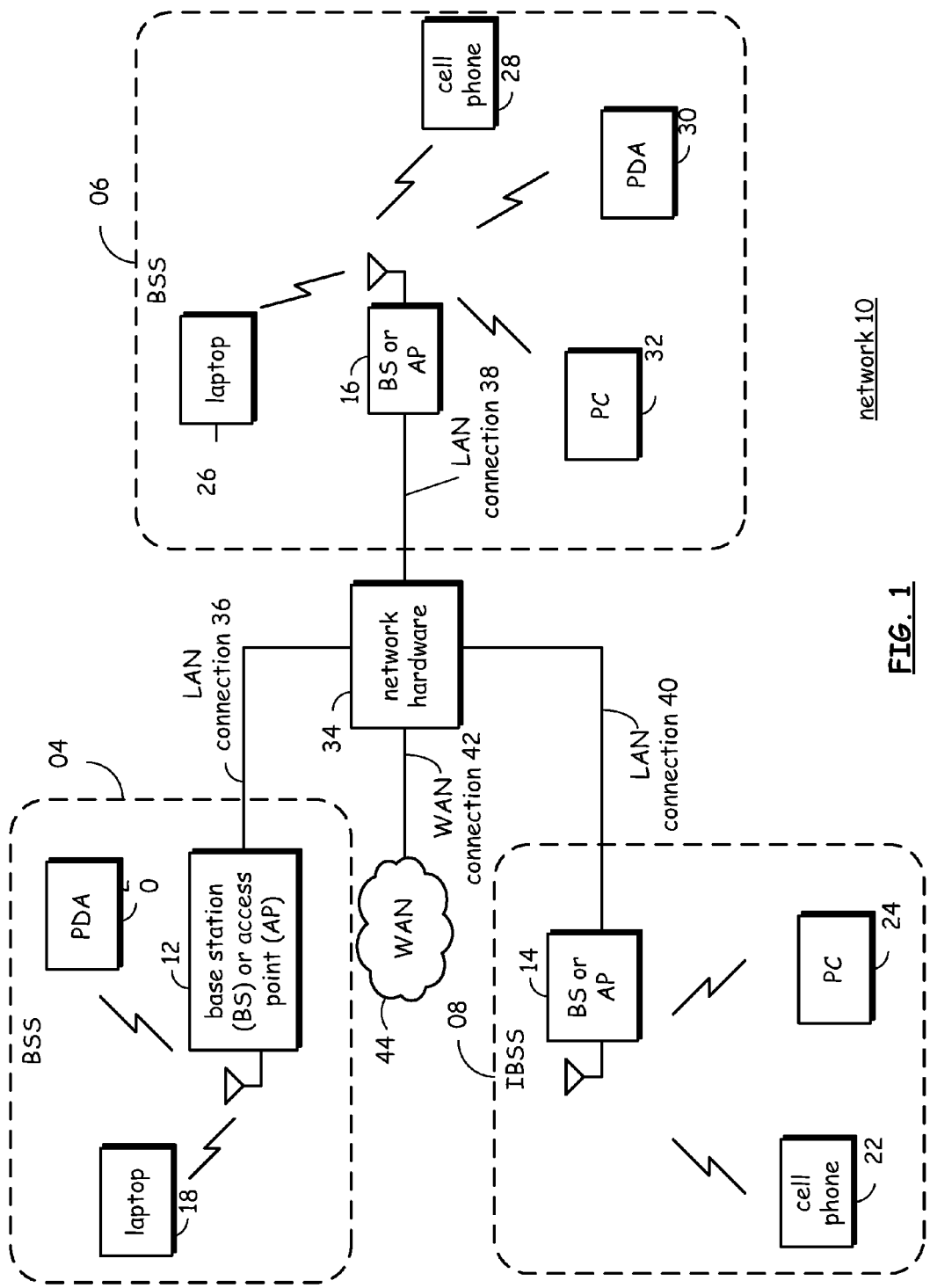
FIG. 1 is a functional block diagram illustrating a communication system that includes circuit devices and network elements and operation thereof according to one embodiment of the invention.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. Any of the wireless communication devices 18-32 may comprise a plurality of communication modules that communicate according to different communication protocols. Thus, the devices may support personal area network communications, wireless local area network communications, infrared communications, and cellular communications of one or more types of cellular protocols. The details of the wireless communication devices and their operation will be described in greater detail with reference to the Figures that follow. References herein to devices with a range of reference numbers (e.g., devices 18-32) should be understood to mean that a particular device may be any one of the devices 18-32 shown here in FIG. 1.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network (WAN) connection 42 for the communication system 10 to an external network element such as WAN 44. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
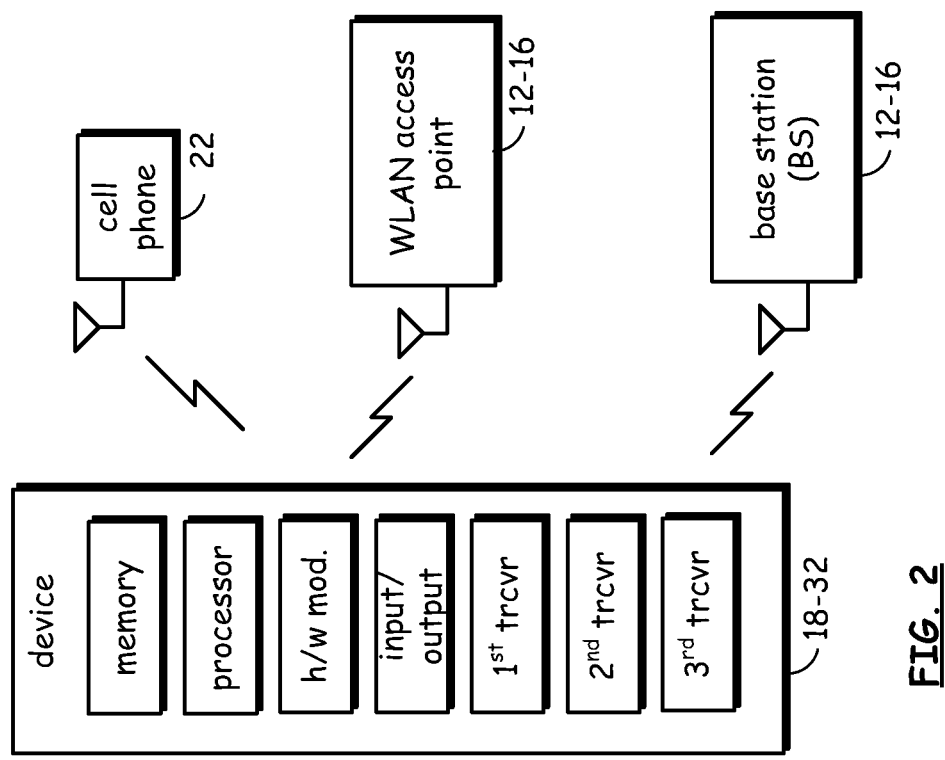
FIG. 2 is a schematic block diagram illustrating a wireless communication device 18-32 that includes a plurality of transceiver circuits and other modules that communicate with other transceivers according to a plurality of communication protocols.

FIG. 2 is a schematic block diagram illustrating a wireless communication device 18-32 that includes a plurality of transceiver circuits and other modules that communicate with other transceivers according to a plurality of communication protocols. Device 18-32 is operable to communicate with cell phone 22 via a personal area network peer to peer communication link, with WLAN access point 12-16 via a WLAN protocol communication such as any one of the IEEE 802.11 based protocols, and with base station 12-16 via an associated cellular communication protocol. To support such communications, device 18-32 includes a plurality of transceivers as shown. Device 18-32 further includes a memory, a processor, a generic hardware module, and an input/output module. Each module, circuit or transceiver (collectively, "module") of device 18-32 of FIG. 2 may require access to memory. Thus, when power control operations seek to power down modules or portions of modules, such a power controller must be able to determine when any portion of anyone of the modules will require powering back up. Typically, such power management is performed by a processor that services associated software that defines such functionality.

Along these lines, it is desirable to also power down memory to reduced power states when access is not required. Using traditional software based logic, however, can be cumbersome in an environment such as that shown in FIG. 2 where many different modules may be memory clients with potentially unknown memory access requirements. Accordingly, as will be described in greater detail below, a system and method for controlling access to memory by each of the memory clients such as these shown here in FIG. 2, is included in device 18-32 that allows hardware logic to control memory access and that supports hardware based power control of memory and memory accessing circuitry to power down circuitry which could not otherwise be powered down using traditional software based approaches for power control.

Figure 3:
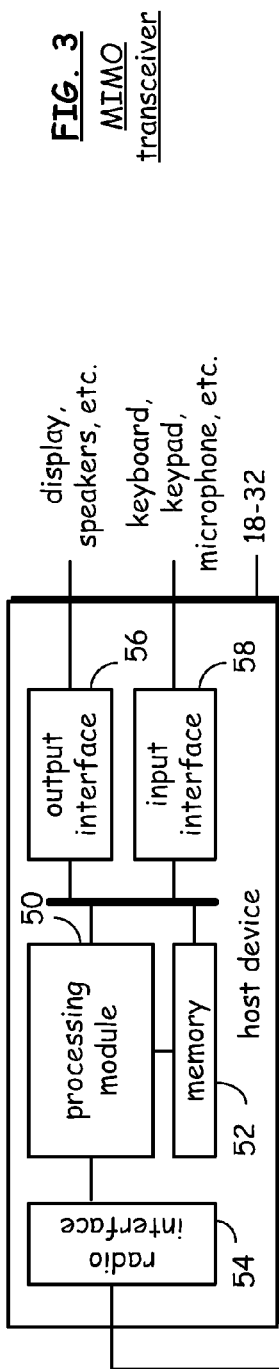
FIG. 3 is a schematic block diagram illustrating a wireless communication device that includes at least one radio.
Figure 3:
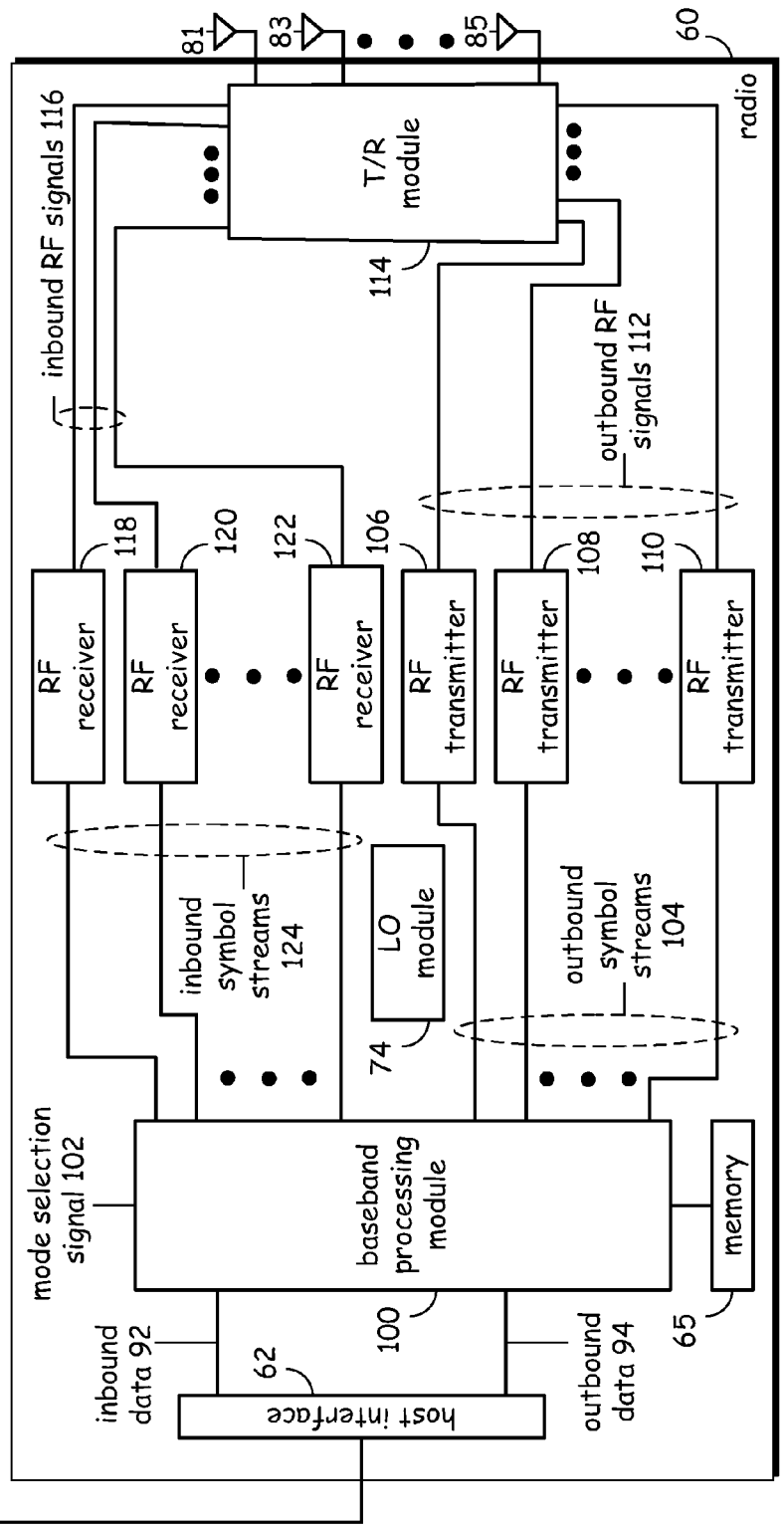

FIG. 3 is a schematic block diagram illustrating a wireless communication device 18-32 that includes at least one radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 service the corresponding instructions that are typically done by the host device. For example, for a cellular telephone host device, the processing module 50 performs the corresponding communication functions in accordance with a particular cellular telephone standard. Any one of the modules of FIG. 3 may require access to memory (52 or 65) according to operational mode and circuit topology.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, and a local oscillation module 74. The baseband processing module 100, in combination with operational instructions stored in memory 65, services digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode selection signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication. Each of these communication parameters may affect memory access requirements including access priority.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates 2, 3 or 4 antennas, the baseband processing module 100 will produce 2, 3 or 4 outbound symbol streams 104 from the outbound data 94.

Depending on the number of outbound symbol streams 104 produced by the baseband processing module 100, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on a first integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
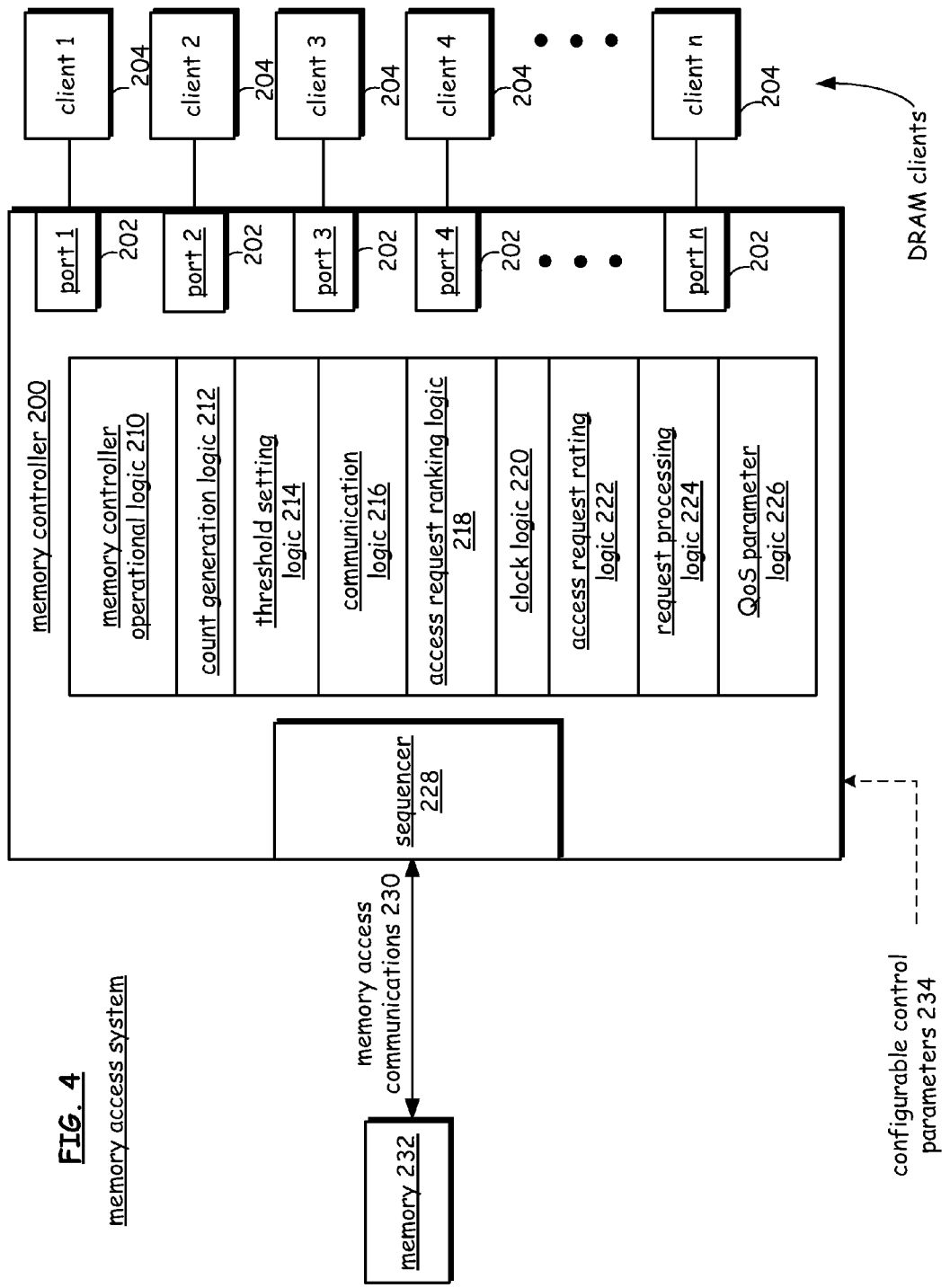
FIG. 4 is a functional block diagram of a memory controller according to one embodiment of the invention.

FIG. 4 is a functional block diagram of a memory controller according to one embodiment of the invention. A memory controller 200, which, more specifically, may be described as a memory controller access request arbiter for controlling access to memory, includes a plurality of ports 202 that are coupled to receive memory access requests from a corresponding plurality of memory access clients 204. Memory controller 200 includes a plurality of discrete and/or logic circuitry that defines the operation of the controller. Generally, controller 200 processes and arbitrates memory access requests in hardware instead of software. Such processing in hardware supports, therefore, processing of parallel access requests received at the plurality of ports 202 in parallel for fast arbitration of the requests. The access requests may also be received in parallel meaning that two or more access requests were received at different ports within a common window of time. The common window of time, for one example, may be during the same clock pulse.

More specifically, controller 200 comprises memory controller operational logic 210 for routine tasks and communications, etc., performed by controller 200. Count generation logic 212 defines operational logic for assigning initial count values to the memory access requests received at ports 202. The initial count values that are assigned may be based upon a plurality of factors including memory client type, specified count values in relation to memory count IDs, logic that determines count values based upon client ID, communication type specified by the memory client, etc. The client types can included, for example whether a memory client is a bandwidth client or a latency client. Bandwidth clients typically generate communications on a periodic basis that may not be as time critical as those from a latency client, for example. Additionally, the count value may also be specified or indicated by the memory client itself. In one embodiment, the memory client transmits an indication of the count value over a wired medium such as a communications bus. The controller 200 thus receives the count value and stores the count value in relation to the client ID.

Thresholdsetting logic 214 defines logic setting thresholds for count values assigned to the memory access requests as the count values are adjust to reflect an amount of time that has elapsed since the individual requests were received at ports 202. Generally, the initial count values and the threshold values for each received memory access request are based upon at least one of the ID of the client 204 that generated memory access request and a client type of the client 204 that generated the memory access request.

Communication logic 216 defines logic for communications between the ports 202 and the clients 204 to receive memory access request and associated data and/or control signals. Access request ranking logic 218 defines logic for ranking all memory access requests received via ports 202. Clock logic 220 defines logic for adjusting count values based upon clock pulses. Access request rating logic 222 defines logic for rating or assigning priority rankings to the access requests as they are received and subsequently as time passes. Request processing logic 224 defines logic for processing requests such as determining if a request is from a valid client, if a request can be satisfied, and if so, actually processing the request by submitting the request to sequencer 228. QoS parameter logic 226 defines logic for setting one or more QoS related fields or values which are used at least in part by the access request ranking logic 218 for ranking access requests. Finally, sequencer 228 receives one or more memory access requests in a ranked order that corresponds to the ranking generated by access request ranking logic 218 and engages in memory access communications 230 with memory 232 that correspond to the memory access request being serviced. For example, if the request is to write data, communications 230 include transmitting the data to memory 232. If the request is to read data, communications 230 include communications to receive data from memory 232. Finally, as may be seen, memory controller is operable to receive configurable control parameters 234 generated by an external logic or device such as, for example, a user interface unit that allows a user to specify some of the parameters evaluated by ranking logic 218.

In operation, controller 200 receives first and second memory access requests from first and second memory clients 204 at first and second ports 202 and subsequently stores the first and second memory access requests and any associated data. Controller 202 then evaluates the memory access requests in parallel and grants access to the memory to the highest ranked priority access request or requests.

More specifically, controller 200 sets a first memory access priority count value based, at least in part, upon an ID of the first memory client 204 that transmitted the first memory access request received at the first port 202. Controller 200 also sets a second memory access priority count value based, at least in part, upon an ID of the second memory client 204 that transmitted the second memory access request received at the second port 202. Generally, the memory access priority count values are based upon an acceptable amount of delay for the memory access request further based upon the client ID.

Upon each clock count, in one embodiment of the invention, controller 200 decrements, in parallel, both of the first and second memory priority access count values. Additionally, upon each clock count, controller 200 determines if either of the first and second memory priority access count values is equal to or below a corresponding threshold value and, if so, assigns a first priority rating. In one embodiment, the threshold value is set to a number that is approximately equal to ¼ to ½ of the priority count value for a corresponding client. In one specific example, an initial count value for one client is set to 50 and the first threshold value is set to 16. The second threshold value is set to 0. In this embodiment, the first threshold value, a "near urgent" threshold, gives the memory access request a higher priority since a certain amount of time has elapsed since the memory access request was received and a window or specified acceptable period for processing the memory access request is nearing the end. The second threshold, an "urgent" threshold is one that signifies that the allowable amount of time for processing the memory access request has elapsed.

In one embodiment of the invention, two client types are defined. The above example is for a latency (first) client type. A second client type is a bandwidth client. Generally, these two client types illustrate two of many possible client types. The initially assigned time or count values and threshold values are different for a bandwidth client. Moreover, the count values are adjusted differently. Generally, bandwidth clients are assumed to have a FIFO to smooth data requirements from the memory controller (here, controller 200) and are further assumed to be more tolerant of a failure to service a memory access request within a required service time. For example, failure to satisfy service time requirements for a bandwidth client may be tolerated as long as, on average, the service time requirements for the bandwidth client are satisfied.

A bandwidth client, on average, sends a memory access request every 50 clock cycles in one embodiment. Its priority is raised to urgent whenever its FIFO holds less than 3 bursts of data. Its urgent count is set to 50, its urgent threshold is set to 150 and a BHC value is initially set to 0. When the first request is received, its BHC will be loaded with 50 and its entry count will be loaded with 50. Its entry threshold will be loaded with 150 so the request will be raised to urgent priority immediately. The BHC and entry count are then decremented on every cycle. When the subsequent requests are received, the urgent count is added to the current value of the BHC. The new BHC value will also be loaded into the client's new entry count. If the urgent count remains below 150+16 or falls below 166 the request will have its priority raised to near urgent. If the urgent count remains below 150 or falls below 150 the request will have its priority raised to urgent. Accordingly, the scheme for this embodiment of the invention contemplates a system that grants priority based on the client being a bandwidth client having tolerance for transmission delays. More generally, in one embodiment, for a bandwidth client, the count value for a received memory access request is based upon a sum of a new priority count value and a decremented priority count value of a prior memory access value. In essence, the smaller the sum, the higher the priority. Thus, the system evaluates all priority count values and, generally, grants priority to the memory access requests having the lowest count values.

Upon each clock count, controller 200 determines if either of the first and second memory priority access count values is equal to or below a corresponding urgent priority value and, if so, assigns a second priority rating regardless of whether the client is a latency or a bandwidth type of client. Thereafter, controller 200 determines whether the first, the second or a third memory access request from a third memory client has the highest priority to access memory based upon associated priority access count values and priority ratings. In one embodiment, controller 200 generates a priority access list that ranks stored memory access requests and subsequently grants access to memory based upon the determined highest priority of the priority access list.

Memory access requests are added to the above described priority access list, in one embodiment, only if one or more conditions are satisfied. Thus, controller 200, prior to placing the received memory access request in the priority access list, verifies at least one of whether:

write data is available if the memory access request is for writing data to the memory;

the memory controller is ready to write data and is not busy with another incompatible task if the memory access request is for writing data to the memory;

the memory controller read port is available to retrieve data if the memory access request is for reading data from the memory;

the memory controller read port is ready to read data from the read port;

a client ID that generated the memory access request is valid;

write after read (WAR) checks are passed; and read after write (RAW) checks are passed.

Each of the above parameters may be stored in either content addressable memory (CAM), in a bit register, or in other known manners for access by controller 200 hardware logic. Generally, these parameters are stored in a manner that supports parallel access by hardware logic as part of hardware processing memory access requests in parallel. For example, such parameters may be stored in a CAM 252 or a bit register 260 as described below in relation to FIG. 5.

One additional aspect of the embodiments of the present invention includes loading QoS data for each access request in a content addressable memory (CAM), the QoS data including at least one of:

key and mask information that includes an ID or set of IDs of the memory client(s);

a read enable indication;

a write enable indication;

a latency or bandwidth type client indication that specifies whether the client is a latency or bandwidth client (this affects counter value setting and modification as previously described);

a priority rating;

the memory access priority count value; (urgent, near urgent, etc.);

the first threshold value (e.g., a "near urgent count value");

the second threshold value (e.g., a "near urgent count value"); and bandwidth history information which may be used to set either initial count values or any one of the plurality of defined threshold values. In one embodiment, priority of requests is elevated based on the later requests with dependencies on them (e.g., if a RAW requirement is detected). Then the earlier lower priority item is increased in priority to match the dependent access. As one example, if a pending write access request is being delayed when a related higher priority read request is received, the priority of the write request is increased so that the write operation may occur in a manner that the read request priority is satisfied.

One aspect of the above described embodiments of the invention is that count values and defined thresholds are used to rank and prioritize memory access requests from the plurality of clients. In one clock pulse period, for example, multiple memory access requests may be received at a plurality of ports coupled to receive memory access requests. In this case, such requests are referenced herein as being received in parallel.

The various logic modules 210-226 of FIG. 4 generate one or more of the conditions for placing a memory access request in the prioritized list (and keeping it on the list) and the QoS parameters as described above. Further, the prioritized access list rankings and rank categories ("urgent" or "near urgent") is adjusted each clock cycle based upon new priority access count values that result from adjusted count values for latency and bandwidth clients as described above and further based upon receipt of new memory access requests.

After the prioritized access list rankings and rank categories is adjusted, ranked memory access requests are sent in a pipelined manner to sequencer 228. In one embodiment, two memory access requests are initially sent wherein an additional memory access request is sent each time one is completed (which completion may be determined by receipt of explicit signals or flags or by signals from which access completion may be inferred).

In one embodiment, configurable control parameters 234 are received from an external source. These parameters 234 can include define operational conditions or QoS parameters reflecting the overall load or use case of the system. For example, a default initial count value used for latency or bandwidth clients may be received as one of the configurable control parameters 234. As another example, threshold values that are to be used for latency or bandwidth clients may be received as one of the configurable control parameters 234. Alternately, a number of memory access requests that are to be produced sequentially to the sequencer 228 to be pipelined to improve operational efficiencies may be specified as one of the received configurable control parameters 234. Further, count or threshold values may be specified in the received configurable control parameters 234 for each of the clients 204 that may produce memory access requests to the ports 202.

Figure 5:
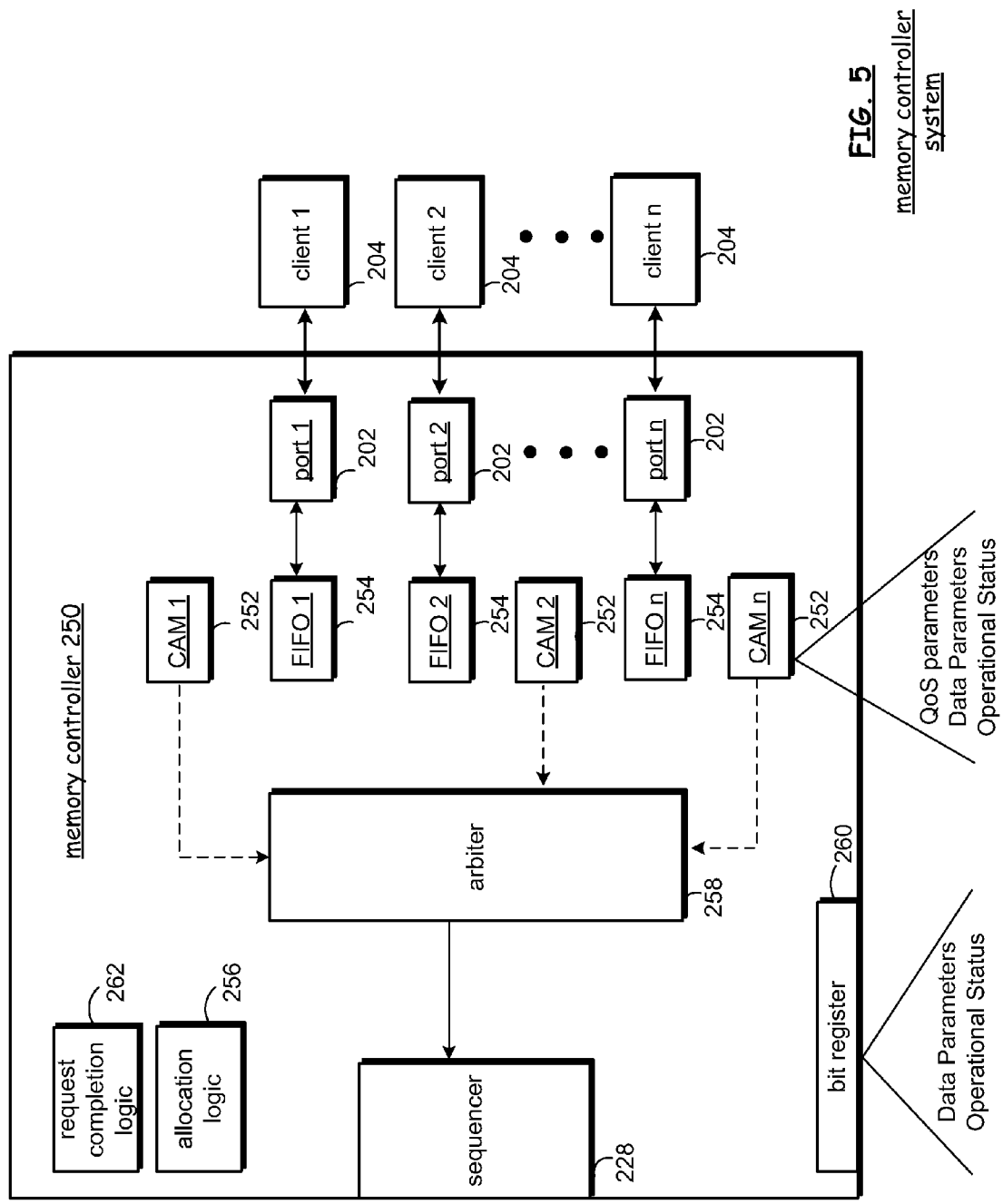
FIG. 5 is a functional block diagram of a memory controller 250 according to one embodiment of the invention.

FIG. 5 is a functional block diagram of a memory controller 250 according to one embodiment of the invention. Controller 250 includes a plurality of ports 202 for receiving memory access requests from a plurality of clients 204 as described in relation to FIG. 4. Additionally, for each port 202, controller 250 includes a CAM 252 and a FIFO 254. CAM 252 is for storing at least one of QoS parameters, data parameters and operational status information corresponding to a received memory access request from a memory client 204. FIFO 254 is for storing data associated with the memory access request received from client 204. FIFO 254 may also store information associated with the memory access request.

Allocation logic 256 allocates a FIFO 254 and a CAM 252 for each received memory access request from available FIFOs 254 and CAMs 252. More specifically, allocation logic 256 is operable to determine what FIFO 254 and what associated CAM 252 should be used to store a memory access request and/or associated data. In one embodiment, allocation logic 256 selects a plurality of FIFOs 254 and CAMs 252 for a corresponding plurality of memory access requests received in a single clock pulse.

An arbiter 258 is operably coupled to, in parallel, evaluate information in each of the CAMs 252 and/or information in a bit register 260 to arbitrate a plurality of memory access requests to select pending memory access requests for accessing the memory as previously described. Bit register 260, in one embodiment, stores data parameters and/or operational status. The arbiter 258 effectively uses the assigned time (or counter) values to perform complex arbitration for access requests from a variety of client by delaying servicing of access requests (read and/or write) by a tolerable amount to support service efficiencies by grouping access requests and servicing them in a manner that reduces power consumption. In effect, the assigned time values drive the possibilities for delaying, grouping and processing memory access requests. By knowing the time or counter values of the most critical memory access requests, for example, in relation to servicing requirements, a memory controller is operable to determine what operations can be performed to improve servicing efficiencies and/or reduce power consumption.

The selected request is the passed to the sequencer which supports the selected access to memory. In one embodiment, a subsequently ranked request is also passed to sequencer 228 which "pipelines" memory access requests to support efficient memory access requests. For some memory types with higher pipelining, more requests may required to be pipelined, these requests are however already fully sequenced and prioritized. Specifically, by pipelining such memory access requests, sequencer is operable to determine that to sequential requests seek to access a common page of memory. Accordingly, after access is completed for the first access request, the page is not closed to allow the second access request to be completed faster and with lower energy consumption. Along these lines, in one embodiment, a page of memory is left open after the completion of a memory access request until a different page of the same bank of memory is required to be opened to service a memory access request or until another condition requires the page to be closed. For example, an open page is closed to perform a refresh in one embodiment.

Request completion logic 262 is operable to determine when a memory access request has been completed by sequencer 228. Logic 262 is operable to evaluate received signals that indication completion of an access either explicitly or implicitly. Once request completion logic 262 makes such a determination, logic 262 generates an indication for arbiter 258. Arbiter 258, in response, produces the currently highest ranked memory access request to sequencer 228 while another memory access request is being processed by sequencer 228. More generally, however, request completion logic 262 is further operable to generate memory access related parameters such as whether write data is available if the memory access request is for writing data to the memory, the memory controller is ready to write data and is not busy with another incompatible task if the memory access request is for writing data to the memory, the memory controller read port is available to retrieve data if the memory access request is for reading data from the memory, the memory controller read port is ready to read data from the read port, WAR checks are passed and RAW checks are passed. Logic 262 is further operable to store these memory access related parameters in CAM 252 and/or bit register 260 in one embodiment. Some or more of these parameters may be stored elsewhere so long as the structure of the storing circuitry is one that may readily be accessed by arbiter 258 as part of arbitrating memory access requests.

Figure 6:
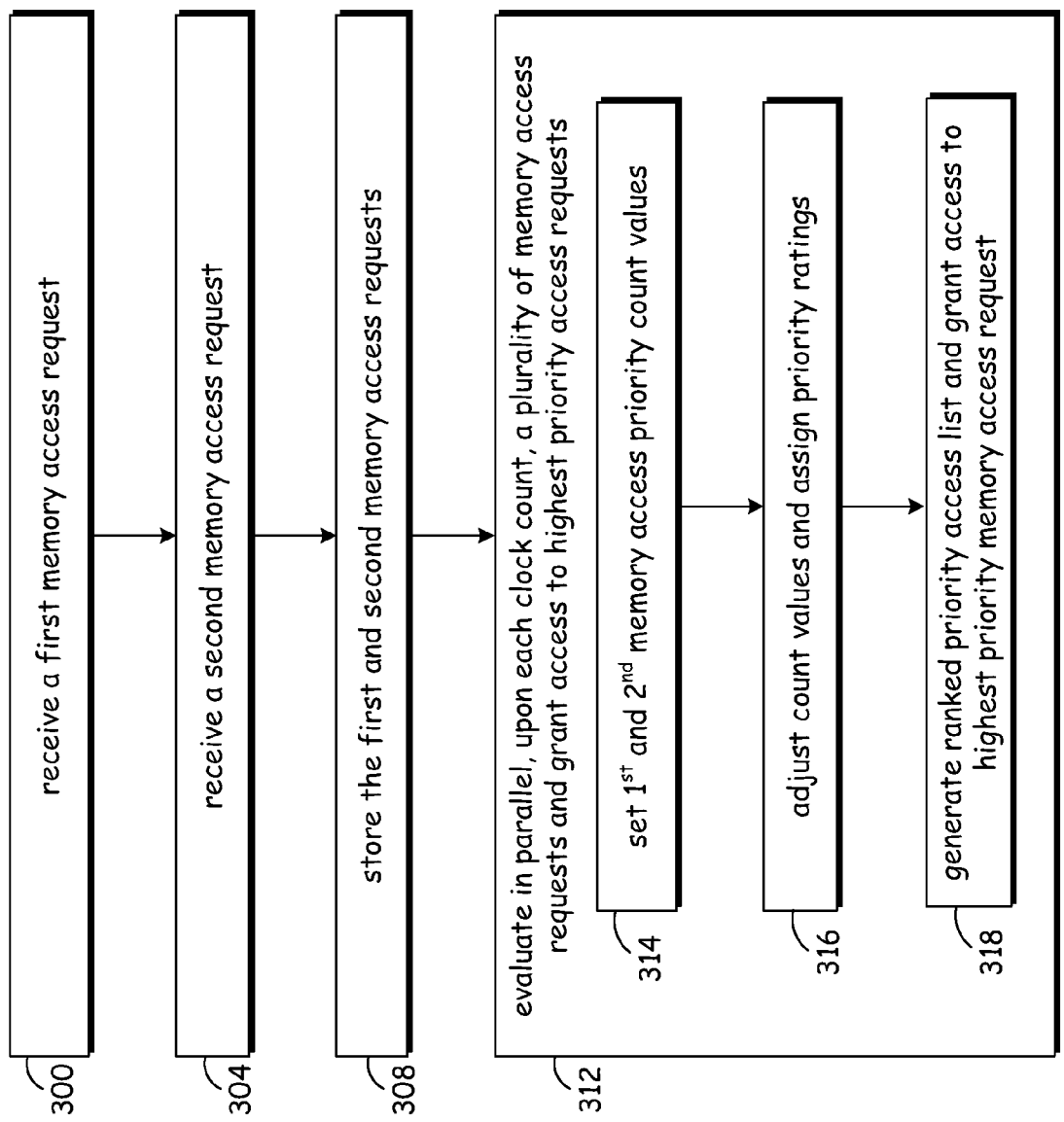
FIGS. 6 and 7 are flow charts illustrating aspects of the various embodiments of the invention for controlling access to memory.
Figure 7:
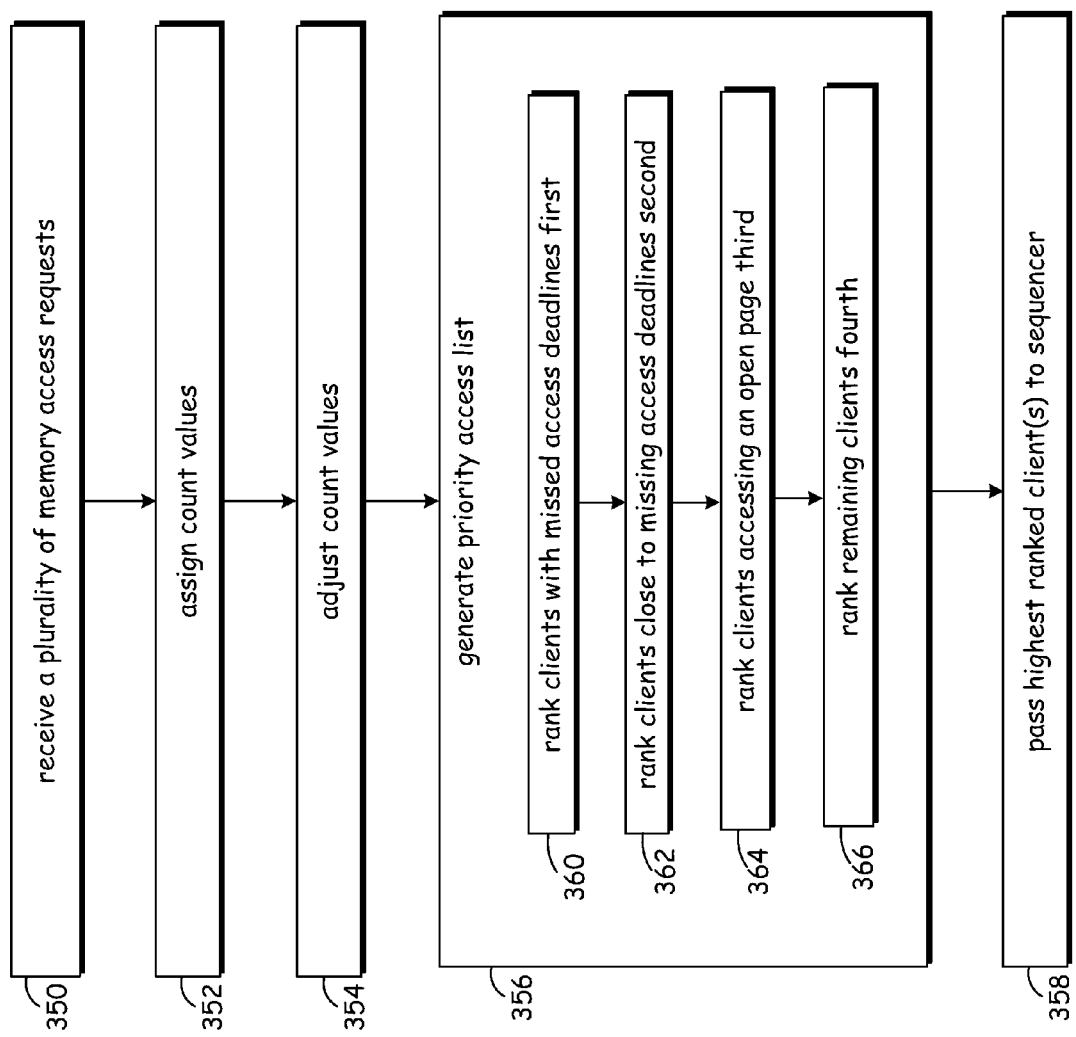

FIGS. 6 and 7 are flow charts illustrating aspects of the various embodiments of the invention for controlling access to memory. Referring to FIG. 6, a method includes receiving a first memory access request from a first memory client at a first port (300) and a second memory access request from a second memory client at a second port (304). The received first and second memory access requests are then stored (308). Finally, the method includes evaluating in parallel, upon each clock count in one embodiment, a plurality of memory access requests and granting access to highest priority access requests (312).

Step 312 further includes setting a first memory access priority count value based, at least in part, upon an ID of the first memory client and setting a second memory access priority count value based, at least in part, upon an ID of the second memory client (314). Setting each memory access priority count value is generally based upon an acceptable amount of delay for an associated memory access request based on the client ID. The method further includes adjusting count values and, optionally, assigning priority ratings to the memory access requests (316). The count values are typically compared to threshold values. The threshold values are set based upon any one or more of the client ID, a specified acceptable delay for granting the memory access, and the client type (latency or bandwidth, for example). Thus, priority ratings are generated based upon count values in relation to threshold values. In one embodiment, a first threshold value may be set to a number that is approximately equal to ¼ to ½ of the priority count value for a corresponding client based on the client ID. A second threshold value may be set to correspond to an amount of time that is approximately equal to an acceptable delay for servicing the memory access request. For a latency client, for example, may have a first memory access priority count value set equal to 50, the first threshold value equal to 16, and the urgent priority value to 0. Here, the count values are decremented based upon a clock signal. A bandwidth client may have different values and logic for adjusting the count value(s). For example, the count value for a received memory access request may be based upon a sum of a new priority count value and a decremented priority count value of a prior memory access value.

In one embodiment, priority ratings are not assigned. Adjusting count values includes, upon each clock count, decrementing, in parallel, both of the first and second memory priority access count values. In another embodiment, at least one type of count value is adjusting by adding a count value each time a new request is received from the same memory access client.

Finally, the method includes generating a priority access list that ranks stored memory access requests and granting access to memory based upon the determined highest priority (318). The priority access list is based upon the priority access count values in one embodiment. In another embodiment, the priority access list is based upon both the priority access count values and priority ratings.

Generating the ranked priority access list in step 318 includes, prior to placing the received memory access request in the priority access list, verifying at least one of whether:
write data is available;
the memory controller is ready to write data;

the memory controller read port is available to retrieve data;

the memory controller read port is ready to send read data to port;

a client ID that generated the memory access request is valid;

write after read (WAR) checks are passed; and read after write (RAW) checks are passed.

Generating the ranked priority access list in step 318 includes evaluating QoS data loaded for each access request in a content addressable memory (CAM), the QoS data including at least one of:

key and mask information;

a read enable indication;

a write enable indication;

a latency or bandwidth type client indication;

a priority rating;

the memory access priority count value; (urgent, near urgent, etc.);

the first threshold value;

the second threshold value; and bandwidth history information.

The bandwidth history information may show that, on average, memory access requests for a particular client are not being serviced within required service times. As such, either initially assigned time values or threshold values may be adjusted to change the priority for memory access requests received from that client.

Referring now to FIG. 7, the method includes in a memory controller access request arbiter for controlling access to memory. The method generally includes receiving a plurality of memory access requests (350). The memory access requests may include at least one of read access requests and write access requests. Count values are then assigned (352) to each memory access request based upon at least one of a client type and a client ID. The count values are adjusted (354) by decrementing, in parallel, the assigned count values based upon a clock pulse in one embodiment. The method further includes generating a priority access list (356) in a ranked order. Generating the priority access list (in a ranked order) includes evaluating at least one criteria to determine, for each of the received memory access requests, whether the memory access request can be placed within the priority access list.

Finally, the method includes passing the highest ranked client to a sequencer to allow the requested access (358) to be serviced. In one embodiment, this step includes passing the highest ranked memory access request to the sequencer prior to completion of a prior passed memory access request.

The priority access list is generated by ranking clients with missed access deadlines first priority (360). If each of a plurality of memory access requests has passed a deadline and is ranked first priority, an oldest passed deadline is ranked first and a second oldest passed deadline is ranked second. The method further includes ranking clients close to missing access deadlines second priority (362). If a plurality of memory access requests are close to missing access deadlines and are ranked second priority, a memory request closest in time to being ranked first priority is ranked first of the memory access requests ranked second priority and a memory access request second closest to being ranked first priority is ranked second of the second ranked memory access requests. The method further includes ranking clients accessing an open page third priority (364) and ranking remaining clients fourth priority (366). The deadlines are determined based upon any one or more of client ID, client type, and associated QoS parameters. Thus, the method includes evaluating in parallel, for each memory access request received in parallel, at least one QoS criteria to determine initial count values that are used subsequently to generate the prioritized access list. Count values, which correlate to elapsed time, are adjusted based upon clock cycles in one embodiment. In one embodiment, the count values and priority access list are evaluated every clock cycle.

Thus, the method includes evaluating in parallel, for each memory access request received, the client type, and subsequently adjusting the assigned count values based in part on the client type. The method includes, therefore, ranking memory access requests and updating the ranked priority access list based upon updated count values and updated access priority rankings. In one embodiment, the above methods correspond to providing memory access to memory that comprises dynamic random access memory (DRAM) which is required to be accessed by a plurality of clients. DRAM, as is known by one of average skill in the art, requires power to maintain data. Typically, DRAM comprises capacitive elements that have a required refresh rate to maintain the logical value of the data stored within the capacitive elements.

Figure 8:
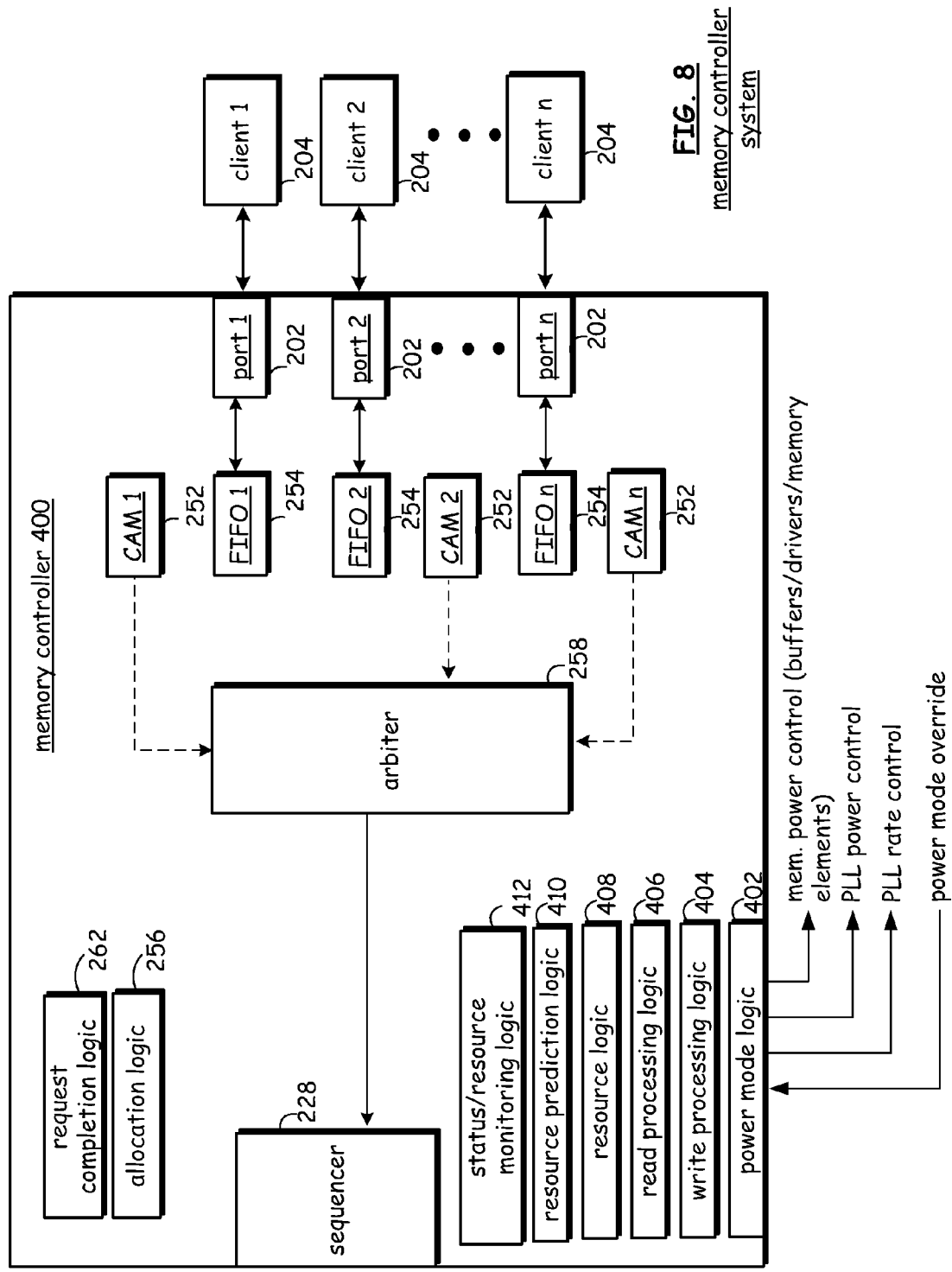
FIG. 8 is a functional block diagram of a memory controller 400 that includes logic for improving power usage efficiency according to one embodiment of the present invention.

FIG. 8 is a functional block diagram of a memory controller 400 that includes logic for improving power usage efficiency according to one embodiment of the present invention.

One important aspect of the embodiments of the invention for a memory controller is that of power control. Minimize the power consumption in a hand held device prolong battery life. Memory interfaces use a significant amount of power (when the memory device is "active"). Accordingly, in various embodiments of the invention, there are multiple memory device states, each having different levels of power consumption. The states including transition states, therefore, affect power consumption inversely to operational readiness. The lowest power state which maintains memory content is "self refresh" which has a penalty for access and is available for some types of memory. Accordingly, it is desirable to include operational logic in a memory controller that finds a balance between degrading performance (e.g., response time), consuming power unnecessarily and saving power. Moreover, because entering low power states have associated power penalty for access, lower power states are entered only in conditions in which the power savings will likely exceed access costs while not degrading performance to an unacceptable amount.

In prior art systems, a processor controls device power modes according logic defined in software. Because reactionary software logic is typically interrupt driven, however, a response time is substantially large that a memory controller cannot power down portions of memory unless a user selected mode allows such powering down. In the embodiments of the present invention, however, power control logic for a memory controller is defined in hardware (e.g., logic circuitry or similar) which allows for reduced power modes to be activated even for an operational device because response time to a memory access request can be much faster than a software based system as utilized in the prior art. Stated differently, using hardware to manage the power modes of a memory controller and associated memory elements allows state transitions to occur quickly. Thus, power savings modes may be utilized during normal operation rather than in specific cases or modes to reduce power consumption.

Typically, memory is divided into either four or eight portions or divisions. Each division is often referred to as a bank of memory. In many embodiments of the invention, for example, there are four banks of memory. Each memory bank then has a large number of pages. Closing and opening pages is time consuming and expensive in terms of power. For example, four clock cycles may required to close a page and five clock cycles may be required to open a page.

A memory controller with hardware based logic for power control according to a plurality of memory power modes of operation includes power mode logic for generating power and resource control commands to correspond with one of the plurality of memory power modes of operation or to correspond with transitions between the plurality of memory power modes of operation. The plurality of memory power modes of operation include a self refresh mode wherein all pages of memory are closed and wherein buffers and drivers are powered down. Another mode is a pre-charge mode wherein memory elements, buffers and drivers are powered up and are ready for operation but all pages of memory are closed. A third mode is an active power down mode wherein at least one page is open but a clock is not transmitted to the memory and wherein memory elements, buffers and drivers are powered up and are ready for operation. In some embodiments of the invention, not all of these modes/functions are necessarily implemented. Hardware logic controls operation of the memory controller to operate in these (an potentially other) power modes of operation and to transition between the modes of operation in a manner that memory access timing requirements for read and write requests for the various memory clients are not violated. Such operation may be found, for example, in the embodiment of power controller 400 of FIG. 8.

Referring now to FIG. 8, one may note the similarity of the structure with memory controller 250 of FIG. 5. Commonly numbered elements are similar and won't be explain here. In addition to the commonly numbered elements 202-262, memory controller 400 includes a plurality of operational logic blocks 402-410, namely, power mode logic 402, write processing logic 404, read processing logic 406, resource logic 408 and resource prediction logic 410. Each of these operational logic blocks 402-410, in one embodiment, comprise hardware logic circuitry for performing specific tasks. Moreover, logic circuitry supports performing a plurality of functions in parallel to support fast processing that enables the memory controller (e.g., controller 250) to satisfy memory access timing requirements. Operational logic modules 402-412 are operably disposed separate from arbiter 258 and sequencer 228 as shown in FIG. 8. Alternatively, one or more of operational logic modules 402-412 may be operably disposed within either one of arbiter 258 and sequencer 228.

Power mode logic 402 generally comprises operational logic for setting or controlling power levels for memory buffers, memory drivers and other memory elements according to various power modes of operation. Power mode logic 402 also is operable to generate power control commands for one or more phase-locked loops (PLLs) and, optionally, to specify associated PLL clock rates for memory operation. Write processing logic 404 comprises logic for processing write memory access commands in a manner that reduces overall power consumption. Read processing logic 406 comprises logic for processing read memory access commands in a manner that reduces overall power consumption. Resource logic 408 comprises logic for determining and requesting resources that are powered down or in a reduced power state. Resource prediction logic 410 comprises logic for maintaining historical access request data and other operational data for predicting access requests for the purpose of modifying a memory power mode of operation.

Status/resource monitoring logic 412 comprises logic for monitoring ingoing operational control commands and/or commanded mode commands received from an external source. Monitoring logic 412 also comprises logic for monitoring various bit register fields (such as those in bit register 260 of FIG. 5 which is not shown here in FIG. 8), other bit register fields, fields or data content of any of the CAMs 1-$n$ (CAMs 252) and FIFOs 1-$n$ (FIFOs 254). Thus, for example, monitoring logic 412 is operable to determine when an access request is received from a memory client 204. While shown here as separate logic modules, any of the logic modules 402-412 may be combined with each other or be part of other logic circuitry including, for example, arbiter 258 or sequencer 228. In one embodiment, a single read/write processing logic is used in place of read and write processing logics 406 and 404, respectively.

In operation, memory controller 400 uses logic (e.g., logic circuitry in one embodiment) to monitor a plurality of buffers in parallel to determine if a memory access request has been received from a memory client. Generally, controller 400 determines to change from a first memory power mode of operation to a second memory power mode of operation based upon at least one of:

receiving a memory access request;
a time value associated with the memory access request;
a power mode override indication; and
a received mode of memory power mode operation command or parameter.

For example, memory controller 400 may determine to transition from a self-refresh mode, a pre-charge mode, or an active power down mode to a fully operational mode merely upon receiving a memory access request. Alternatively, memory controller may, based upon the current power mode of operation, determine to transition only when a time value associated with a received memory access request is at a value that the transition is required to be initiated to avoid violating response requirements for the memory access request. Memory controller 400 may also initiate a transition based upon receiving a power mode override indication. Memory controller 400 may also initiate a transition based upon a power mode operational command or parameter received or previously specified by/from an external source.

In view of the various power modes of operation described herein, certain principles are employed in various embodiments of the invention to reduce power consumption. These principles include:

a memory controller delays write operations until a condition requires the write access requests to be serviced;

a memory controller attempts to service a plurality of write access requests together, especially to the same page of memory;

a memory controller attempts to service access requests to a specific page together (sequentially, and may choose to process lower priority requests to the same page to minimize overall power consumption) when possible;

a memory controller attempts to transition to a self-refresh power mode of operation once a specified amount of time has elapsed since a memory access;

a memory controller attempts to close pages of memory only when a new page of a common bank needs to be opened to service an access request;

when a memory controller closes a page for a periodic "refresh", no pages are opened until required for access;

when a memory controller receives and stores write access requests in a buffer, the write access requests are serviced once a specified number of write access requests have been stored in the buffer;

when a memory controller receives and stores read access requests in a buffer, the read access requests are serviced when a time or counter value reaches a threshold value that causes at least one read access request to reach a near urgent or an urgent status in relation to timing requirements for servicing (in an embodiment of the invention that implements this principle, one result is that the controller processes memory requests in a burst fashion because multiple requests from the same device may be stored); and a memory controller implements operational logic in hardware in relation to power modes of operation and memory access requests to achieve power control operations that are sufficiently fast that power savings can be realized by powering memory circuit elements and other circuit elements and modules to reduced power states while satisfying memory access servicing requirements.

Accordingly, the logic and operation herein include, in the various embodiments, logic to achieve one or more of the above principles to reduce overall power consumption and to increase battery life.

Figure 9:
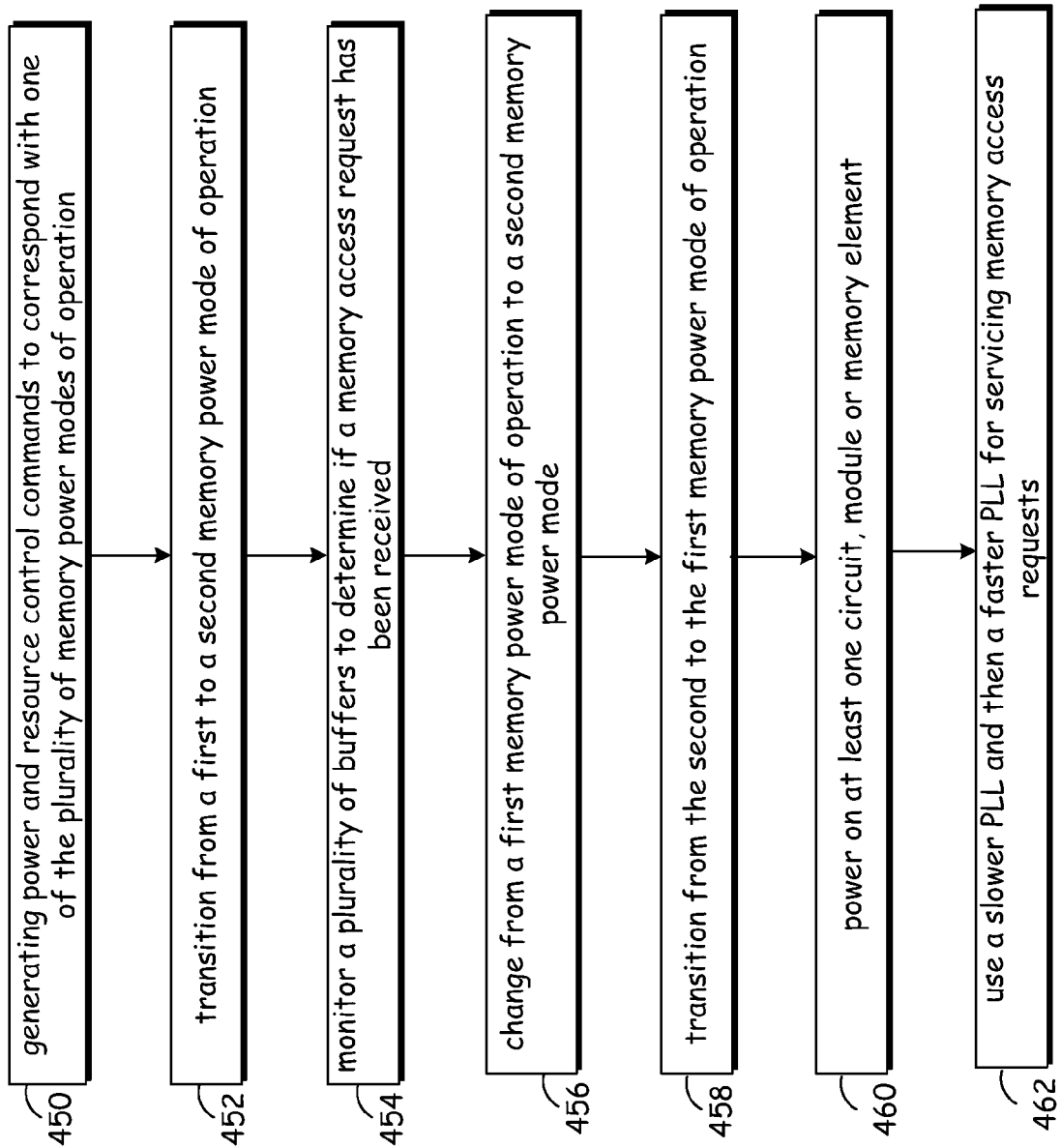
FIG. 9 is a flow chart that illustrates a method according to one embodiment of the invention for changing power modes of operation based upon a received memory access request.

FIG. 9 is a flow chart that illustrates a method according to one embodiment of the invention for changing power modes of operation based upon a received memory access request. Referring now to FIG. 9, a method for operation of a memory controller for power control according to a plurality of memory power modes of operation is illustrated. The method includes generating power and resource control commands to correspond with one of the plurality of memory power modes of operation or to correspond with transitions between a plurality of memory power modes of operation (450). While operating in one of a plurality of power modes of operation, the method includes determining to transition from a first to a second memory power mode of operation wherein the second memory power mode of operation is a reduced memory power mode of operation (452). Thereafter, the method includes the memory controller monitoring a plurality of buffers to determine if a memory access request has been received from a memory client (454). In at least one embodiment, at least two buffers are monitored in parallel by logic circuitry.

Based upon one or more received memory access requests, the method includes the memory controller determining to change from the second memory power mode of operation to the first memory power mode of operation (456). Generally, the second memory power mode of operation is one that uses less power than the first memory power mode of operation. The power modes of operation may be any of the ones described herein or similar power modes of operation.

This determination to transition from the second to the first memory power mode of operation may be based solely upon a received memory access request or upon a plurality of memory access requests. For example, if a specified number of write memory access requests are stored in memory or in a buffer because of one or more recently received memory access requests, the memory controller may determine to transition to an active power state to service the write memory access requests. Alternatively, the memory controller may determine to transition to an active state if a priority value, e.g., a time value or a count value for a received memory access request is one that requires activation of circuitry in a reduced power state so that the memory access request can be serviced without violating (additionally) timing requirements for the servicing of the memory access request. If no such request is present, the controller may choose to wait with the requests queued before the memory is accessed.

Generally, according to the defined power modes of operation, operating according to a memory power mode of operation includes the memory controller generating power and resource control commands include at least one of memory power control commands for powering memory elements and memory power control commands for power for buffers, drivers, phase locked loop (PLL) circuit elements. The power and resource control commands can also include generating commands for controlling PLL clock rates.

The memory controller is operable to determine to transition from a reduced memory power mode of operation (any one of the reduced power modes of operation) to an active power mode of operation to support all required operations. Using terminology from before, this comprises transitioning from the second to the first power mode of operation (step 458).

The determination to transition from the second to the first memory power mode of operation may be based on any one of a plurality of conditions or events. For example, the memory controller is operably disposed to receive a power mode override indication from an external source to operate in a memory power mode of operation based on the received power mode override indication. The memory controller is also operable to receive and store write memory access requests and then to service at least a portion of the write memory access requests to prevent a buffer being used to store the write memory access requests from being filled. In one embodiment, a counter is used to count each stored write memory access request. Write memory access requests are then serviced when the counter reaches or exceeds a defined or threshold value. Additionally, the memory controller is operable to service stored write memory access request when a read access request requires servicing.

More specifically, in one embodiment, therefore, the memory controller receives a write memory access request from a first memory client, stores the write memory access request in a buffer and sends an indication of a write completion to the first memory client. Accordingly, if a read memory access request requires servicing, the memory controller services the stored write memory access requests prior to servicing the read memory access request. Thus, if the memory controller is in a second memory power mode of operation and a memory access request requires servicing (e.g., because of the buffer count or because a read memory access request needs servicing to comply with service timing requirements for the read memory access request, or if a power mode override indication is received, the memory controller needs to transition to the first memory power mode of operation. A part of transitioning to the first memory power mode of operation includes the memory controller generating memory power control commands or signals to power one or more of memory elements, buffers, drivers, and PLLs and optionally generating commands to control PLL clock rates (460).

Additionally, or alternatively, the memory controller may also determine to service all of the write requests stored in the buffer prior to transitioning to a different memory power mode of operation. For example, the memory controller services all write memory access requests prior to transitioning from the first to the second memory power mode of operation.

One aspect of the embodiments of the invention is that service timing requirements for memory access requests, especially read memory access requests, are such that full transition from a second memory power mode of operation to a first memory power mode of operation cannot always be done fast enough to satisfy the service timing requirement. In an embodiment of the invention that comprises a plurality of PLLs, the memory controller is operable to being servicing memory access requests while transitioning to the first memory power mode of operation. If, for example, a slower clock rate (lower oscillation frequency) PLL is operable to reach steady state when powered up more quickly than a faster clock rate PLL, the memory controller is operable use the slower PLL initially and then alternatively use the faster PLL to service memory access requests. Accordingly, for example, the memory controller is operable to detect that a memory access request has been received and requires servicing, and to generate memory power control commands to bring memory out of a lower power mode of operation, to generate at least one PLL power control command to receive a slower clock from a first PLL, to perform memory accesses based on the slower clock and subsequently to receive a faster clock from a second PLL and to perform subsequent memory accesses based on the faster clock from the second PLL (462).

As described in greater detail herein, the memory controller is operable to assign an access time value to a received access request based upon an ID of the memory client that transmitted the memory access request. In one embodiment, the access time value is a counter value that is decremented with each clock pulse. Thereafter, the memory controller compares the access time value to one or more threshold values and determines, based on the comparison of the access time value to a threshold value, to transition to a reduced memory power mode of operation.

In operation, therefore, according to at least one embodiment of the invention including the method steps of FIG. 9 and/or the circuitry of FIG. 8, an access time value is initially assigned to a memory access request and is subsequently modified based upon clock pulses. The memory controller determines to transition to a low power memory power mode of operation if the access time value is one that allows transition to the low power memory power mode of operation and then back to a fully powered memory power mode of operation to service the associated memory access request while complying with access time requirements. In one embodiment, a power down threshold value is used to make power down determinations. Alternatively, a plurality of power down threshold values may be used corresponding to a plurality of low power memory power modes of operation. The power down threshold values may be defined in advance as discrete values or, alternatively, they may be defined in relation to other threshold values. For example, if a "near urgent" threshold value is a counter value of "10", the power down threshold value for determining to power down may be a number that is added to the "near urgent" threshold value (e.g., "5" or "10"). Thus if the power down threshold value or counter value for a memory access request is equal to or greater than 20 (e.g., relative power down threshold of 10+near urgent threshold of 10), then the memory controller may determine to transition to a lower memory power mode of operation. Thereafter, if a received configuration parameter is received to change the "near urgent" threshold, the power down threshold value would automatically adjust.

Figure 10:
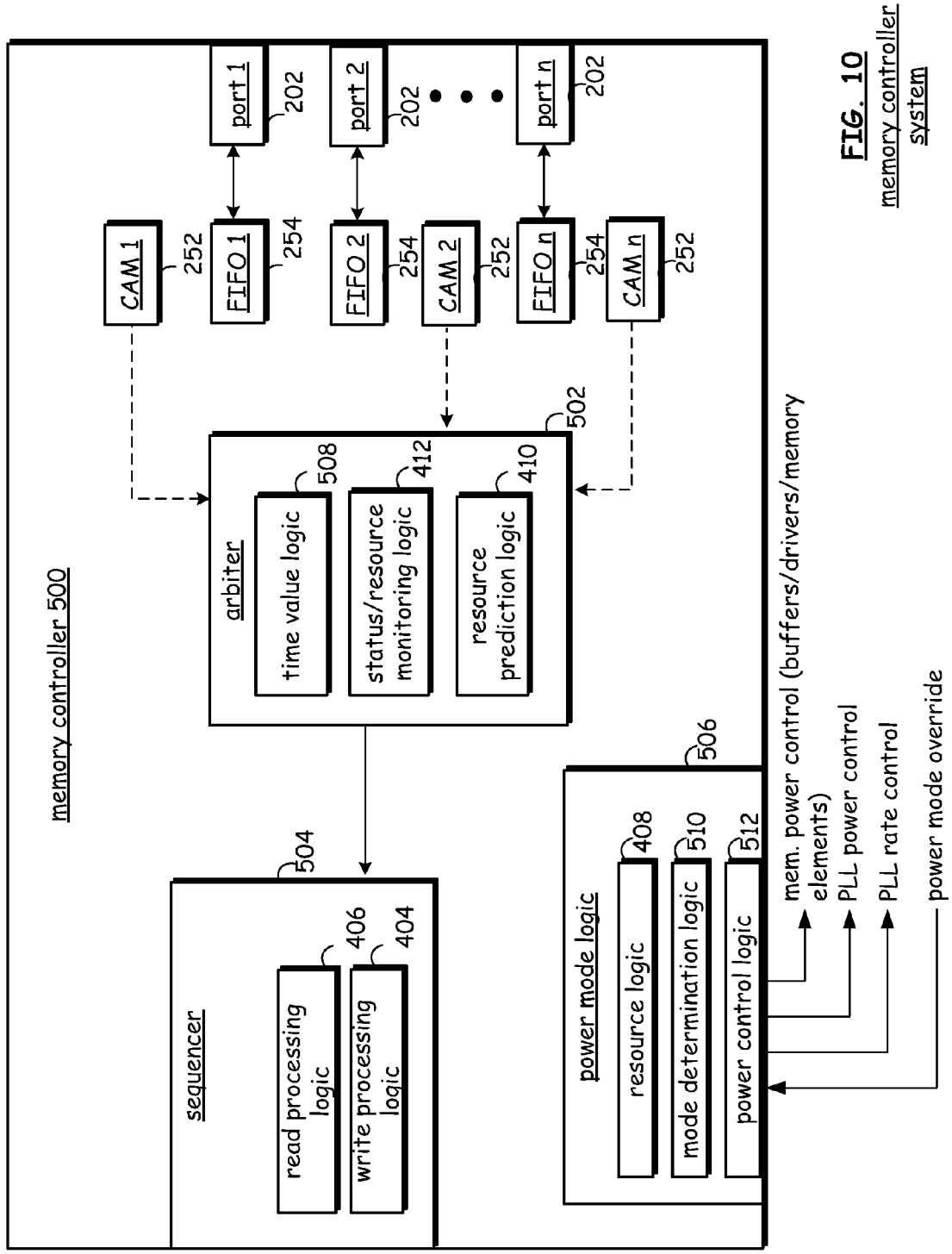
FIG. 10 is a functional block diagram of a alternative embodiment of the invention for a memory controller.

FIG. 10 is a functional block diagram of a alternative embodiment of the invention for a memory controller. Memory controller 500 includes the ports 202, CAMs 252 and FIFOs 254 as described before. Additionally, controller 500 includes operational logic modules 404-412 as described before. In contrast to FIG. 8 wherein the logic modules 402-412 are separate from other modules within the memory controller, however, modules 404-412 are disposed within one of an arbiter 502, a sequencer 504, or a power mode logic 506.

More specifically, resource prediction logic 410 and status/resource monitoring logic 412 are disposed within (and a part of) arbiter 502. Write processing logic 404 and read processing logic 406 are disposed within sequencer 504 while resource logic 408 is disposed within power mode logic 506. Operation and characteristics of modules 404-412 are as previously described. Memory controller 500 of FIG. 10 further includes time value logic 508, mode determination logic 510 and power control logic 512. Logic 508 is disposed within (and a part of) arbiter 502 while logic 510 and logic 512 are disposed within power mode logic 502.

Time value logic 508 is operable to assign time values to memory access requests received through ports 202 from associated memory clients based upon a memory access type and upon an ID of the associated memory client. Logic 508 is further operable to adjust the assigned time values based upon clock pulses generated by a clock, PLL, crystal, etc. In one embodiment, the assigned time value is a counter and the counter value is decremented based on clock pulses. Alternatively, assigned time values or counter values may be incremented. Corresponding threshold values may be specified according to the type of implementation that is utilized. One of average skill in the art may readily modify the described embodiments in such a manner to achieve a similar operational result.

Mode determination logic 510 is operable to determine whether to operate in a reduced memory power mode of operation or to transition to a different memory power mode of operation. In one embodiment, the memory power mode of operation can be any one of a self-refresh mode, a pre-charge mode, or an active power down mode or other power defined modes. Logic 510 is operable, for example, to cause the memory controller to transition to a self-refresh power mode of operation once a specified amount of time has elapsed since a memory access or if the most urgent memory access request has an associated time value (or counter value) that exceeds either a round trip time (power down time plus power up time) or the round trip time plus an additional amount of time or a specified time value. Logic 510 is further operation to cause memory power mode of operation transitions based upon a received configuration indication or control command.

Power control logic 512 generates memory power control commands to control power for buffers, drivers and/or memory elements as well as PLL(s). Logic 512 also generates PLL rate control signals (in one embodiment) to specify PLL oscillation frequency or clock rates that correspond to a selected memory power mode of operation.

In operation, memory controller 500 delays servicing write requests by storing the write requests in a buffer until the buffer has a specified number of write requests stored therein, services write requests consecutively that are associated with common pages of memory, closes open pages of memory when new pages of the same bank are required for a pending access, closes open pages of memory when performing a refresh and only opens pages of memory when needed to service an access request. When the memory controller 512 is in a reduced memory power mode of operation, memory controller 512 transitions to an active power mode by:

detecting that a memory access request has been received that has an associated time value that indicates that power up is required to service the memory access request within an associated timing requirement;

generating memory power control commands to bring memory out of a lower power mode of operation;

generating at least one PLL power control command to receive a slower clock from a first PLL;

performing memory accesses based on the slower clock;

subsequently receiving a faster clock; and performing subsequent memory accesses based on the faster clock.

The faster clock is received, in one embodiment, in response to the memory controller (e.g., power control logic 512) generating a power control command to the faster PLL to prompt the faster PLL to generate higher frequency oscillations to drive a faster clock pulse. It should be understood, however, that the clock pulses based on the faster PLL are utilized once the PLL has reached steady state after being power on.

Figure 11:
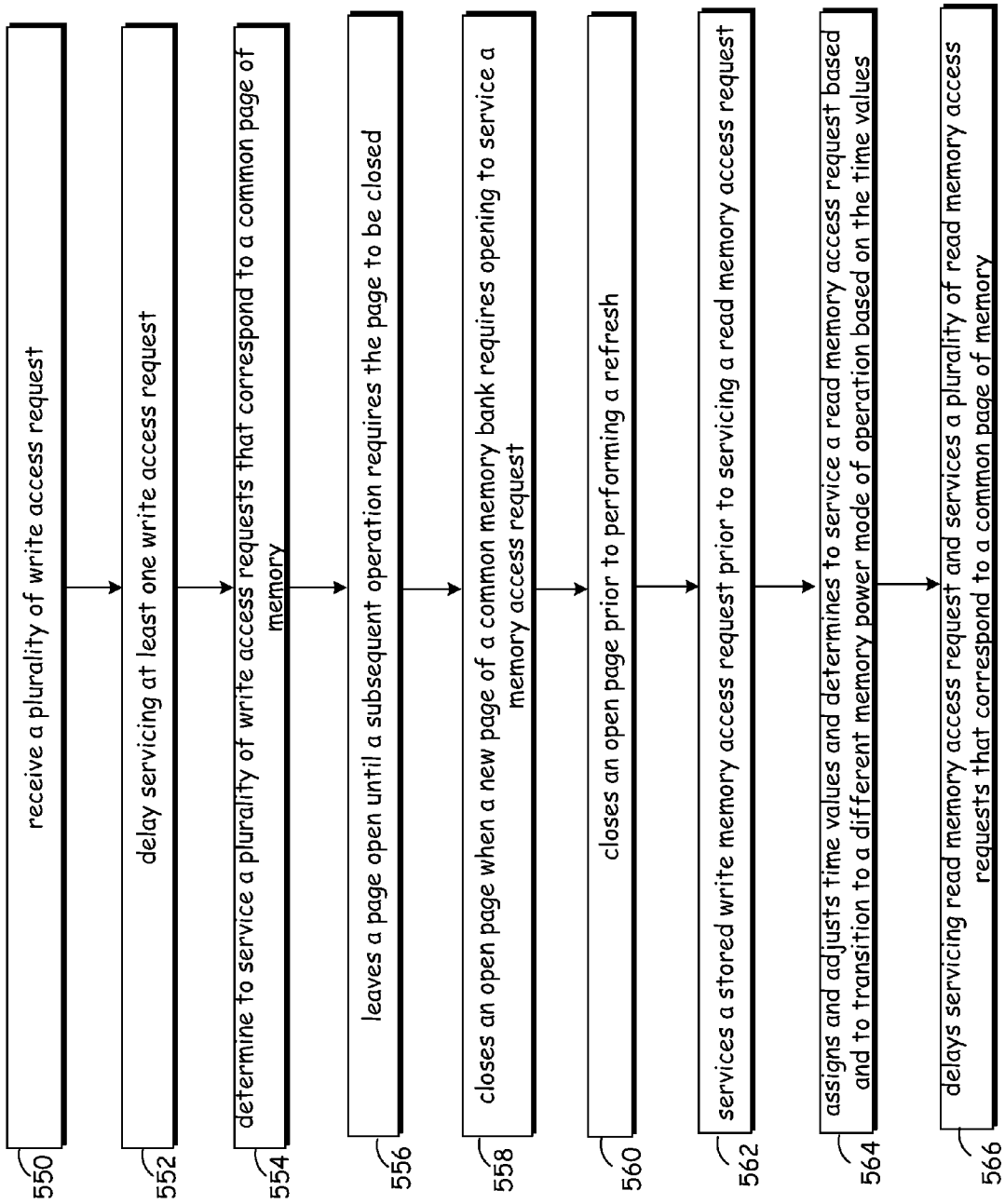
FIG. 11 is a flow chart that illustrates a method of operation for one embodiment of a memory controller.

FIG. 11 is a flow chart that illustrates a method of operation for one embodiment of a memory controller. The method of FIG. 11 includes a memory controller receiving a plurality of write access request (550) and delaying the servicing at least one write access request (552). Thereafter, the method includes determining to service a plurality of write access requests that correspond to a common page of memory (554). The memory controller, in one embodiment, leaves a page of memory open until a subsequent operation requires the page to be closed (556). The memory controller closes an open page when a new page of a common memory bank requires opening to service a memory access request (558) and when a refresh needs to be performed (560). Additionally, the memory controller services a stored write memory access request prior to servicing a read memory access request (562). As described before, in one embodiment, the memory controller, upon receive a write memory access request from a client, generates a reply indication to the client that the write memory access has been serviced and, instead of servicing the write memory access request, stores the write memory access request in a buffer. Accordingly, when a read memory access request requires servicing, the memory controller services the write memory requests stored in the buffer. In one embodiment, all of the write memory access requests stored in the buffer are serviced prior to the read memory access request. In an alternative embodiment, only the write memory requests that correspond to the same page of memory as the read memory access request that is about to be serviced are serviced prior to the read memory access request.

Generally, the memory controller assigns and adjusts time values and determines to service a read memory access request based and to transition to a different memory power mode of operation based on the time values (564). Thus, in one embodiment, the memory controller also delays servicing read memory access request and services a plurality of read memory access requests that correspond to a common page of memory once at least one of the read memory access requests requires servicing to comply with a service timing requirement (566).

Requests from particular devices often exhibit periodicity (e.g., for a refresh of a screen or similar functions). In one embodiment of the invention, a periodicity indication flag is maintained for each source device as well as a counter. The flag indicates whether a device makes memory access requests periodically (exhibits periodicity) or whether it requests access to memory on a random or non-periodic manner. The counter indicates the expected time to next access for periodic clients. This value is set via hardware. Thus, if the flag is set to indicate a periodic client and the counter reaches zero, the memory controller is operable to determine that it will shortly receive an access from an associated device and will perform or initiate a wakeup (initiate a transition to a higher power mode). The flag is reset by software in one embodiment. The flag is also reset when a specified number of miss-predictions (either no access when one is expected or one when none is expected or accesses do not have large gaps) have occurred. The time is set based on a counter counting the time since the last access and comparing to a minimum). In alternative embodiments, other means for maintaining an indication of a periodic client may be used. For example, merely assigning a counter or clock that represents typical periods between memory access requests to a memory client may adequately allow the memory controller to determine to power up a circuit or device based upon an expected memory access request.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. A method in a memory controller for power control according to a plurality of memory power modes of operation, comprising:
   generating power and resource control commands to correspond with one of the plurality of memory power modes of operation or to correspond with transitions between the plurality of memory power modes of operation;
   determining to transition from a first memory power mode of operation in which read and write memory access requests are received and serviced to a second memory power mode of operation, wherein the second memory power mode of operation is a reduced memory power mode of operation in which write memory access requests are received but not serviced;
   monitoring a plurality of buffers to determine if a read memory access request has been received from a memory client;
   determining to change from the second memory power mode of operation to the first memory power mode of operation upon detecting that the read memory access request has been received;
   if any write memory access requests are stored in the plurality of buffers, servicing the write memory access requests stored in the plurality of buffers; and
   after servicing at least one of the write memory access requests, servicing the read memory access request.

2. The method of claim 1 wherein monitoring the plurality of buffers includes monitoring at least two buffers of the plurality of buffers in parallel.

3. The method of claim 1 wherein the power and resource control commands include at least one of:
- power control commands for powering memory elements;
- power control commands for powering buffers;
- power control commands for powering drivers;
- power control commands for powering phase locked loop (PLL) circuit elements; and
- control commands for controlling PLL clock rates.

4. The method of claim 1 further including receiving a power mode override indication and determining to operate in one of the memory power modes of operation based on the received power mode override indication.

5. The method of claim 1 further including:
- receiving a write memory access request from a first memory client;
- storing the write memory access request in a buffer when in the second memory power mode of operation; and
- sending an indication of a write completion to the first memory client prior to servicing the write memory access request.

6. The method of claim 5 further including:
- receiving the read memory access request from one of the first memory client or a second memory client;
- if any write memory access requests are stored in the buffer, servicing the write memory access requests stored in the buffer; and
- after servicing at least one of the write memory access requests and based upon service timing requirements for the read memory access request, servicing the read memory access request.

7. The method of claim 5 including servicing at least a portion of the write memory access requests stored in the buffer prior to receiving the read memory access request to prevent the buffer being filled.

8. The method of claim 1 including servicing all write memory access requests stored in a buffer prior to transitioning to the second memory power mode of operation.

9. The method of claim 1, further including logic circuitry for:
- detecting that the read memory access request has been received;
- generating the power and resource control commands to bring memory out of the second memory power mode of operation;
- generating at least one PLL control command to receive a slower clock from a first PLL;
- perform memory accesses based on the slower clock;
- subsequently receive a faster clock; and
- perform subsequent memory accesses based on the faster clock.

10. A memory controller with hardware based logic for power control according to a plurality of memory power modes of operation, comprising:
- power mode logic for generating power and resource control commands to correspond with one of the plurality of memory power modes of operation or to correspond with transitions between the plurality of memory power modes of operation; and
- wherein the memory controller:
- determines to transition to a reduced memory power mode of operation in which write memory access requests are received but not serviced;
- monitors a plurality of buffers to determine if a read memory access request has been received from a memory client;
- determines to change from the reduced memory power mode of operation to a powered memory power mode of operation upon detecting that the read memory access request has been received;
- generates at least one power and resource control command to increase power of at least one circuit block;
- if any write memory access requests are stored in the plurality of buffers, service the write memory access requests stored in the plurality of buffers; and
- after servicing at least one of the write memory access requests, service the read memory access request.

11. The memory controller of claim 10 wherein the memory controller further includes logic circuitry that monitors at least two of the plurality of buffers in parallel.

12. The memory controller of claim 10 wherein power mode logic generates at least one of:
- power control commands for powering memory elements;
- power control commands for powering buffers;
- power control commands for powering drivers;
- power control commands for powering for phase locked loop (PLL) circuit elements; and
- control commands for controlling PLL clock rates.

13. The memory controller of claim 10 further including an interface for receiving a power mode override indication and logic for determining to operate in a memory power mode of operation based on the received power mode override indication.

14. The memory controller of claim 10 further defining logic for:
- receiving a write memory access request from a first memory client;
- storing the write memory access request in a buffer when in the second memory power mode of operation; and
- sending an indication of a write completion to the first memory client prior to servicing the write memory access request.

15. The memory controller of claim 14 further including logic for:
- receiving the read memory access request from one of the first memory client or a second memory client;
- if any write memory access requests are stored in the buffer, servicing the write memory access requests stored in the buffer; and
- after servicing at least one of the write memory access requests and based upon service timing requirements for the read memory access request, servicing the read memory access request.

16. The memory controller of claim 14 further including logic for servicing at least a portion of the write requests stored in the buffer prior to receiving the read memory access request to prevent the buffer being filled.

17. The memory controller of claim 10 including logic for servicing all write memory access requests stored in a buffer prior to transitioning to the reduced memory power mode of operation.

18. The memory controller of claim 10, further including logic circuitry for:
- detecting that the read memory access request has been received;
- generating power and resource control commands to bring memory out of a lower the reduced memory power mode of operation;
- generating at least one PLL power control command to receive a slower clock from a first PLL;
- performing memory accesses based on the slower clock;
- subsequently receiving a faster clock; and performing subsequent memory accesses based on the faster clock.

19. A memory controller with hardware based logic for power control according to a plurality of memory power modes of operation, comprising:
  power mode logic for generating power and resource control commands to correspond with one of the plurality of memory power modes of operation or to correspond with transitions between the plurality of memory power modes of operation, the plurality of memory power modes of operation including:
    a fully operational memory power mode of operation wherein memory elements, buffers and drivers are powered up and are ready for operation and a clock is transmitted to the memory controller; and
    a reduced memory power mode of operation in which write memory access requests are received but not serviced, the reduced memory power mode of operation being selected from the group consisting of:
      a pre-charge mode wherein memory elements, buffers and drivers are powered up and are ready for operation but all pages of memory are closed; and
      an active power down mode wherein at least one page is open but a clock is not transmitted to the memory and wherein memory elements, buffers and drivers are powered up and are ready for operation;
  wherein the memory controller uses logic circuitry to monitor a plurality of buffers in parallel to determine if a read memory access request has been received from a memory client;
  wherein the memory controller determines to change from the reduced memory power mode of operation to the fully operational memory power mode of operation upon detecting that the read memory access request has been received;
  wherein the memory controller services at least one of the write memory access requests stored in the plurality of buffers prior to servicing the read memory access request.

20. The memory controller of claim 19 wherein the memory controller further includes logic circuitry that monitors at least two of the plurality of buffers in parallel.

21. The memory controller of claim 19 further defining logic for:
  receiving a write memory access request from a first memory client;
  storing the write memory access request in a buffer; and
  sending an indication of a write completion to the first memory client prior to servicing the write memory access request.

22. The memory controller of claim 21 further including logic for:
  receiving the read memory access request from one of the first memory client or a second memory client;
  if any write memory access requests are stored in the buffer, servicing the write memory access requests stored in the buffer; and
  after servicing at least one of the write memory access requests and based upon service timing requirements for the read memory access request, servicing the read memory access request.

23. The memory controller of claim 19, further including logic circuitry for:
  detecting that the read memory access request has been received;
  generating memory power control commands to bring memory out of the reduced power mode of operation;
  generating at least one PLL power control command to receive a slower clock from a first PLL;
  performing at least one of transitioning from the reduced memory power mode of operation and servicing a write memory access based on the slower clock;
  subsequently receiving a faster clock; and
  subsequently operating based on the faster clock.

24. The memory controller of claim 19 wherein the memory controller:
  delays servicing write memory access requests by storing the write memory access requests in a buffer until the read memory access request is received or to prevent the buffer being filled;
  services write memory access requests consecutively that are associated with common pages of memory;
  closes open pages of memory when new pages of the same bank are required for a pending access;
  closes open pages of memory when performing a refresh; and
  only opens pages of memory when needed to service an access request.

* * * * *

UNITED STATES PATENT AND TRADEMARK OFFICE
CERTIFICATE OF CORRECTION

PATENT NO.         : 8,812,889 B2
APPLICATION NO.    : 12/774479
DATED              : August 19, 2014
INVENTOR(S)        : Fullerton et al.

It is certified that error appears in the above-identified patent and that said Letters Patent is hereby corrected as shown below:

In the claims

Col. 24, line 62, in claim 18: after "memory out of" delete "a lower"

Signed and Sealed this
Third Day of November, 2015

Michelle K. Lee
*Director of the United States Patent and Trademark Office*